(12) United States Patent
White

(10) Patent No.: US 10,737,605 B1
(45) Date of Patent: Aug. 11, 2020

(54) MODULAR GRILL MOUNT FOR RECREATIONAL VEHICLES

(71) Applicant: Christopher Brockman White, Mesa, AZ (US)

(72) Inventor: Christopher Brockman White, Mesa, AZ (US)

(73) Assignee: Christopher Brockman White, Mesa, AZ (US)

( * ) Notice: Subject to any disclaimer, the term of this patent is extended or adjusted under 35 U.S.C. 154(b) by 0 days.

(21) Appl. No.: 16/401,700

(22) Filed: May 2, 2019

(51) Int. Cl.
*B60R 9/06* (2006.01)
*B60N 3/16* (2006.01)
*B60P 3/32* (2006.01)

(52) U.S. Cl.
CPC .............. *B60N 3/16* (2013.01); *B60R 9/06* (2013.01); *B60P 3/32* (2013.01)

(58) Field of Classification Search
CPC ..................................... B60R 9/06; B60R 9/065; B60R 19/48; B60R 11/00; B60N 3/16; F24C 15/30
USPC ................... 224/502, 509, 508, 42.32, 42.13
See application file for complete search history.

(56) References Cited

U.S. PATENT DOCUMENTS

| 3,845,891 | A | * | 11/1974 | Becher | B62D 43/002 224/42.21 |
| 4,976,386 | A | * | 12/1990 | Geiger | B60R 9/06 224/401 |
| 5,020,707 | A | * | 6/1991 | Nozel | B62D 43/02 224/42.21 |
| 5,518,156 | A | * | 5/1996 | Lehman | B60N 3/16 224/281 |
| 5,806,736 | A | * | 9/1998 | Kincart | B62D 43/02 224/42.13 |
| 6,701,913 | B1 | * | 3/2004 | LeDuc | B60R 9/06 126/276 |
| 6,796,466 | B2 | * | 9/2004 | Essig | B62D 43/02 224/42.21 |
| 7,281,646 | B2 | * | 10/2007 | Flannery | B60R 9/06 126/276 |

* cited by examiner

Primary Examiner — Adam J Waggenspack
(74) *Attorney, Agent, or Firm* — Griffiths & Seaton PLLC

(57) ABSTRACT

A grill support apparatus for mounting a grill to a recreational vehicle comprises: a pivot assembly comprising a first hinge and a second hinge; a support arm assembly comprising a first support arm attached to the first hinge, a second support arm attached to the second hinge, and a third support arm attached to and vertically separating the first support arm and the second support arm at first ends proximal to the first hinge and the second hinge; where the first support arm and the second support arm are attached to one another at a position distal to the first hinge and the second hinge; and a base grill support platform attached to the second support arm and extending outwardly from the recreational vehicle in a horizontal orientation.

17 Claims, 8 Drawing Sheets

MODULAR GRILL MOUNT FOR RECREATIONAL VEHICLES

BACKGROUND OF THE INVENTION

Field of the Invention

The present disclosure relates generally to an apparatus for mounting a grill to a vehicle. More particularly, the present disclosure relates to a modular grill mount for mounting a cooking grill to a recreational vehicle.

Description of the Related Art

Camping and outdoor recreation is a multi-billion dollar industry with sustained popularity. As part of experiencing the outdoors, a favorable means of transportation/lodging is the use of the recreational vehicle (RV). A recreational vehicle may come in many forms and include such well-known form factors as a motorhome (i.e., a self-propelled vehicle that includes a living space inside), a travel trailer, fifth wheel trailer, or toy hauler (i.e., a rigid trailer unit having a living/garage space therein and designed to be towed by a truck, sport utility vehicle (SUV), etc. using a bumper or frame hitch), or a camper (i.e., a living space unit designed to be temporarily mounted to the bed of a truck).

While many of the aforementioned RVs include living spaces having small kitchens or kitchenettes built in, often times those people recreating outdoors prefer to use portable grills to cook meals. Moreover, people tend to prefer using a familiar or favorite grill of their choosing, although bringing along this type of equipment in the RV may pose challenges due to inherent space restrictions associated therewith.

SUMMARY OF THE INVENTION

Various embodiments of a grill support apparatus for mounting a grill to a recreational vehicle are described herein. In one embodiment, the grill support apparatus comprises: a pivot assembly comprising a first hinge and a second hinge; wherein the first hinge and the second hinge are parallelly attached to a frame of the recreational vehicle; a support arm assembly comprising a first support arm attached to the first hinge, a second support arm attached to the second hinge, and a third support arm attached to and vertically separating the first support arm and the second support arm at first ends proximal to the first hinge and the second hinge; wherein the first support arm and the second support arm are attached to one another at a position distal to the first hinge and the second hinge; and a base grill support platform attached to the second support arm and extending outwardly from the recreational vehicle in a horizontal orientation; wherein the base grill support platform is adapted to securely receive the grill on a top surface thereof.

The foregoing Summary has been provided to introduce a selection of concepts in a simplified form that are further described below in the Detailed Description. The Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
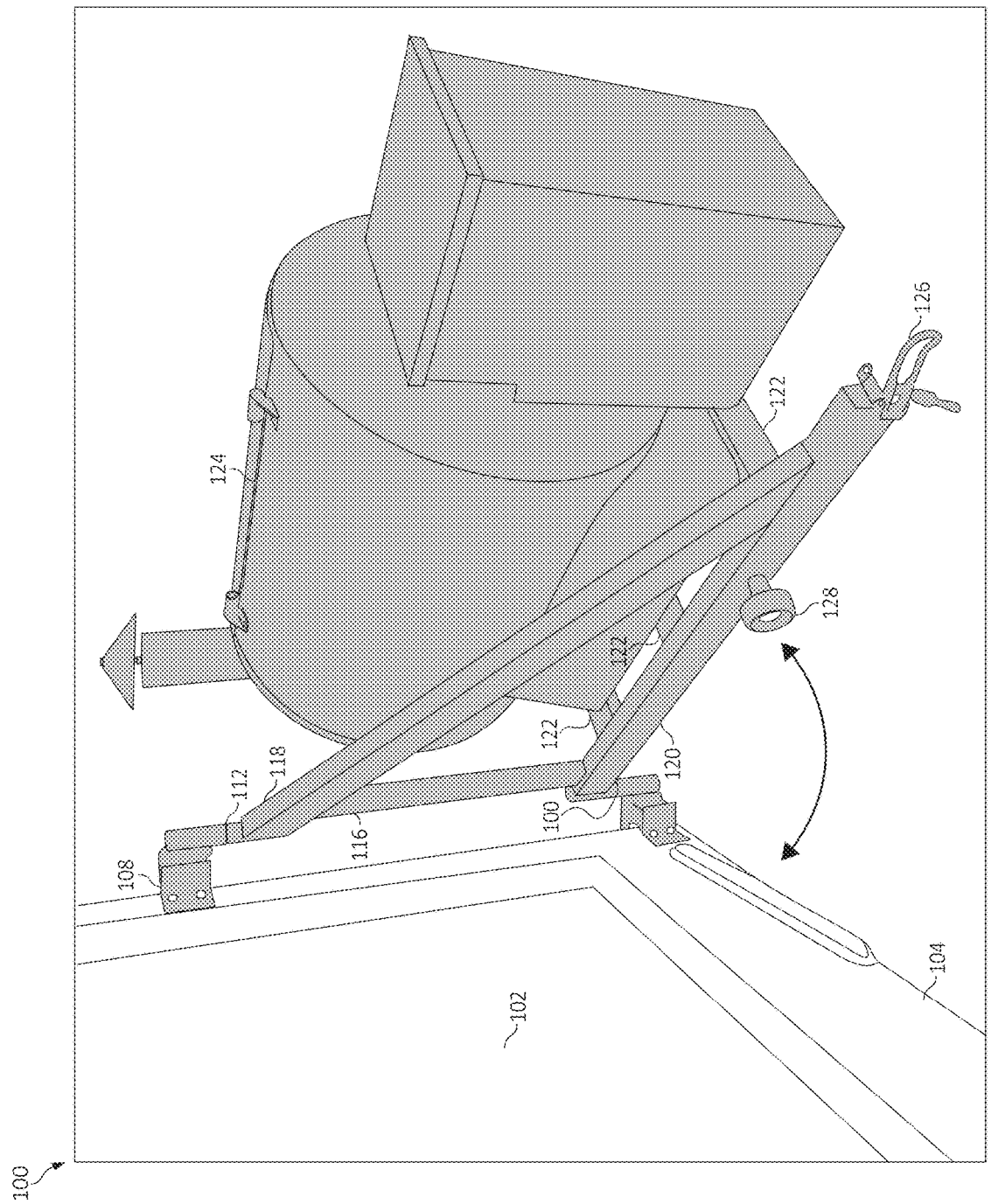
FIG. 1 is a general perspective view illustration of a grill mounting apparatus according to one embodiment of the present invention.
Figure 2:
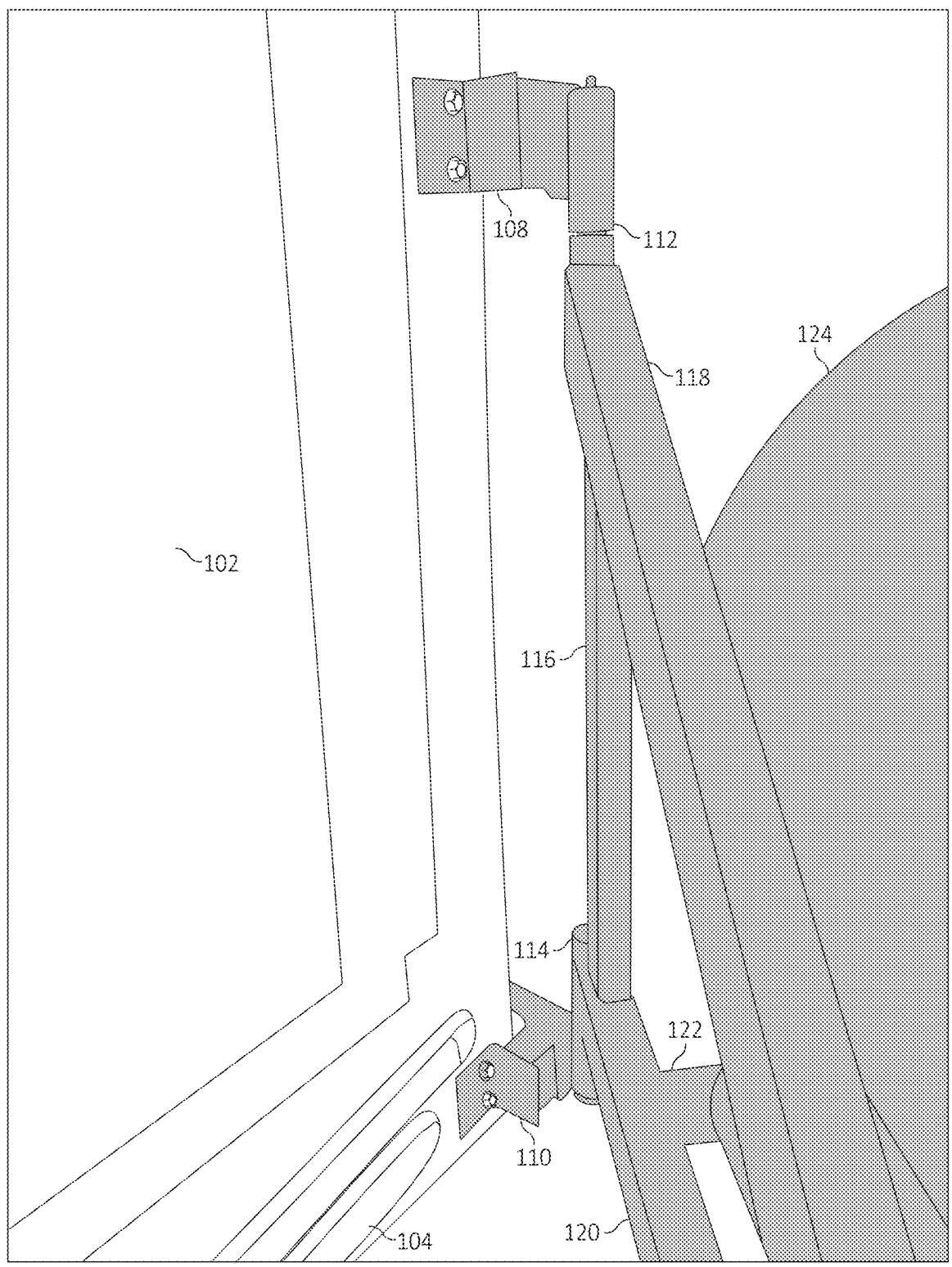
FIG. 2 is a top-side perspective view illustration of a grill mounting apparatus according to one embodiment of the present invention.
Figure 3:
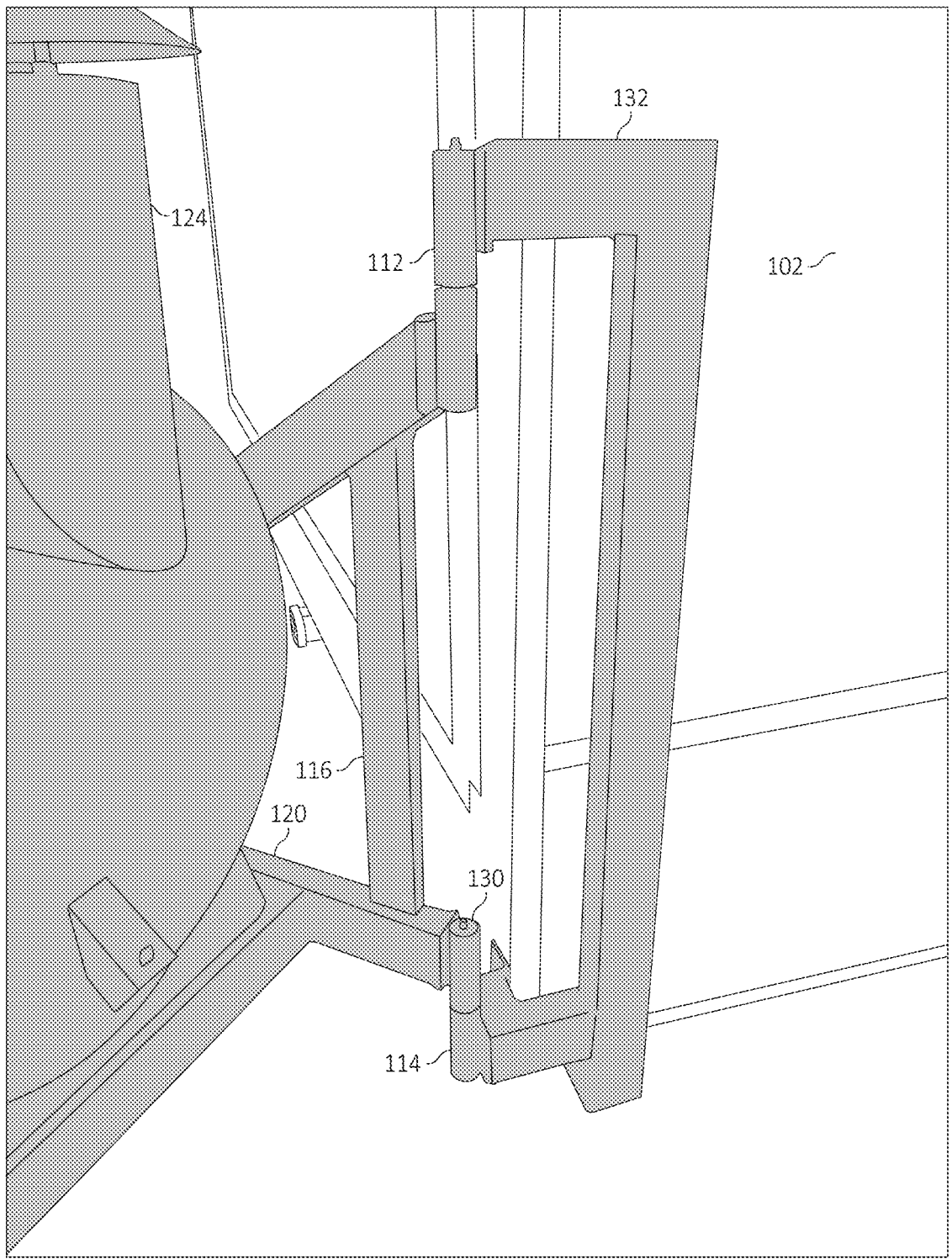
FIG. 3 is an alternate top-side perspective view illustration of a grill apparatus according to one embodiment of the present invention.
Figure 4:
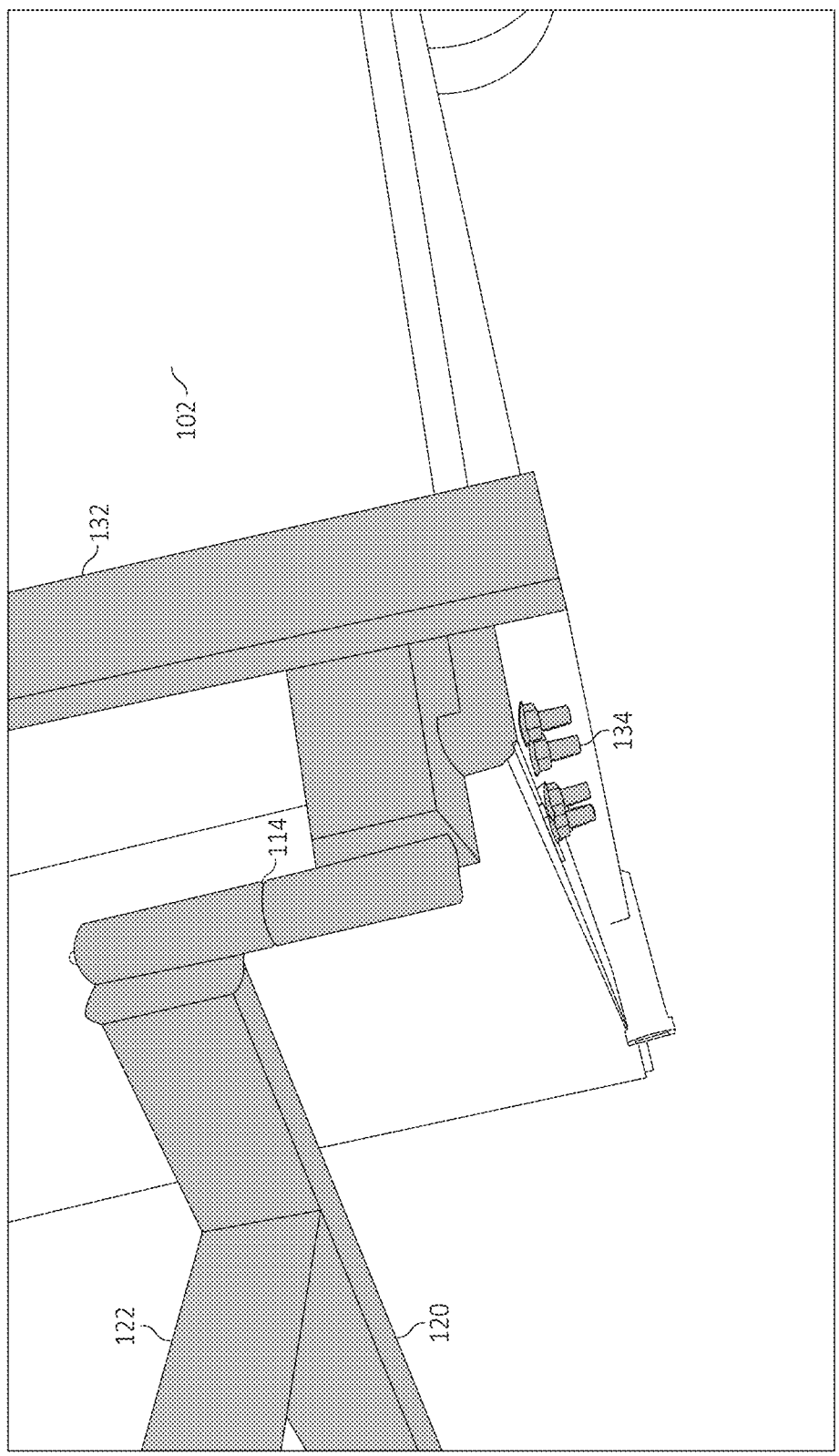
FIG. 4 is a bottom-side perspective view illustration of a grill mounting apparatus according to one embodiment of the present invention.
Figure 5:
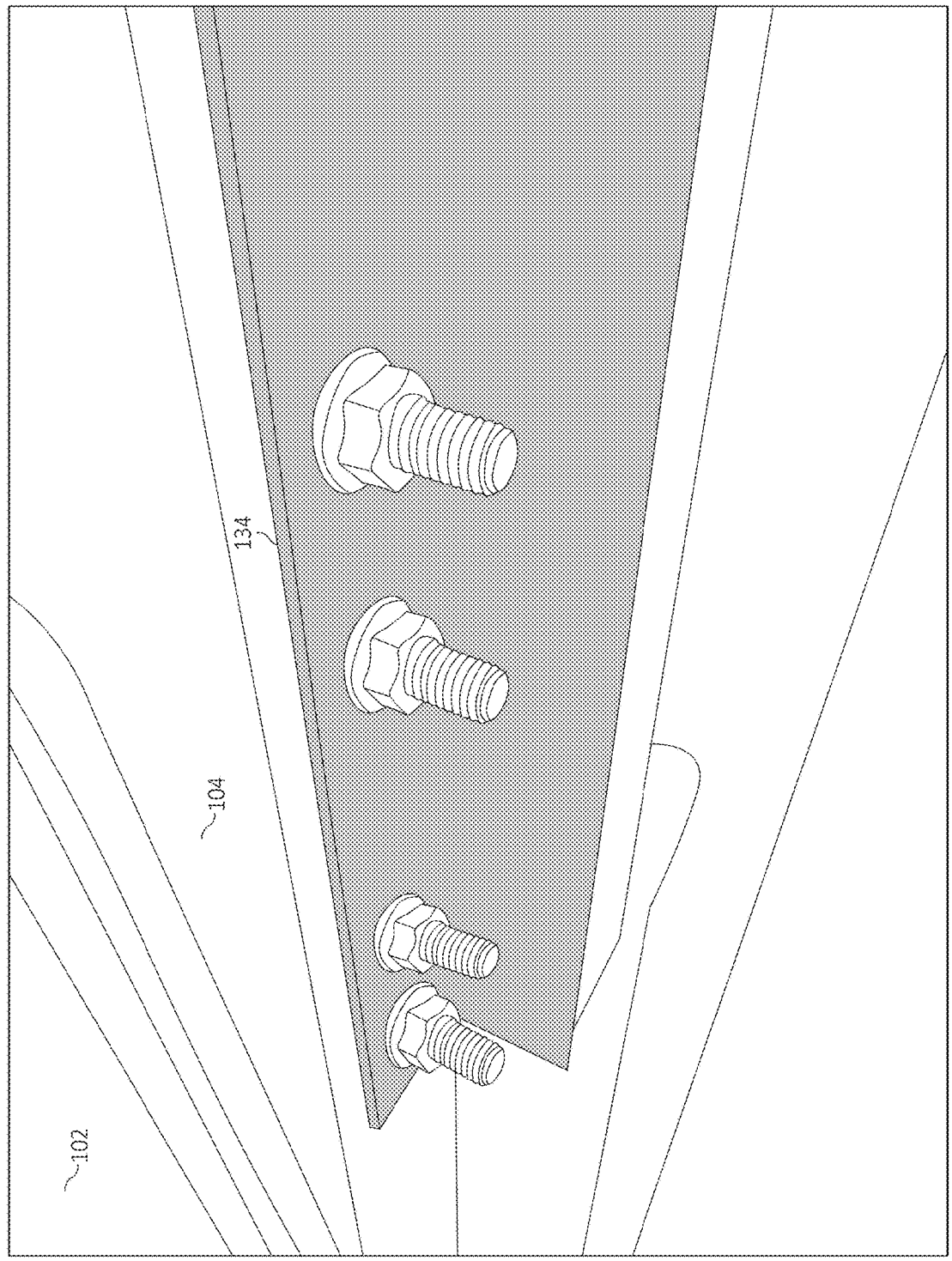
FIG. 5 is an alternative bottom-side perspective view illustration of a grill apparatus according to one embodiment of the present invention.

The following detailed description of the invention merely provides exemplary embodiments and is not intended to limit the invention of the application and uses of the invention. Furthermore, there is no intention to be bound by any theory presented in the preceding background of the invention of the following detailed description of the invention.

Embodiments of the present invention described hereinbelow provide an improved modular grill support apparatus. The grill support apparatus described following is mountable to a structural frame of a vehicle, and is particularly suited to be mounted to the structural frame of a recreational vehicle (RV), such as those described previously. The functionality associated with the described grill support apparatus allows the apparatus to be stowed directly behind and parallel to the vehicle or deployed to one of a plurality of positions between the rear of the vehicle and adjacent a side of the vehicle. Moreover, the grill support apparatus is comprised in modular form and allows for multiple grills (or other apparatus') to be secured thereto without necessitating any changes to the support apparatus attached to the frame of the vehicle. These and other attendant benefits will be further described, and it should be noted that all embodiments of the present invention described herein are examples of implementations of the present invention and should not be taken in a limiting sense.

Turning now to the drawings, and particularly FIGS. 1-8, an example of a grill support apparatus according to the present invention is illustrated and generally designated by the reference numeral 100. The apparatus 100 is shown attached to the frame 104 (e.g., a chassis) of the vehicle 102 (i.e., a recreational vehicle), which in this instance, the frame 104 extends the length and width of the back of the vehicle 102 such as to create a box at a rearward portion of the vehicle in the vertical plane. In one embodiment, the frame 104 of the vehicle 102 is made of metal, although in some implementations, a composite material may be used. The apparatus 100 is attached to the frame 104 of the vehicle 102 as shown by a pivot assembly comprising a first mount plate 108, a second mount plate 110, and a third mount plate 134 (see FIGS. 4 and 5). Each of the first mount plate 108, second mount plate 110, and third mount plate 134 are comprised of plated material (e.g., a plate of steel) of either square or rectangular dimension having a shorter depth than their length and widths. Each of the first mount plate 108, second mount plate 110, and third mount plate 134 are attached to the frame 104 of the vehicle 102 via any convenient securing means, although the depicted embodiment shows the securing means as fasteners such as bolts. In another example, each of the first mount plate 108, second mount plate 110, and third mount plate 134 are permanently attached (i.e., by welding) to the frame 104 of the vehicle 102. In some embodiments, a gap between the frame 104 and the subframe (not shown) of the vehicle may provide space whereby the fasteners (e.g., bolts) may be positioned through holes of the respective mount plates, through the vehicle frame 104, and secured with other fasteners (e.g., threaded nuts) behind the vehicle frame 104. However, this embodiment is not limiting, and any bolts, screws, or fasteners known in the art may be used to secure the respective mount plates to the vehicle frame 104.

In the depicted embodiment, the first mount plate 108 and the second mount plate 110 are fastened to the vehicle frame 104 parallel to each other in a vertical orientation. That is, the first mount plate 108 and the second mount plate 110 are attached to the vehicle 102 in substantially a straight line such that the first mount plate 108 is attached to the vehicle frame 104 some distance directly above the second mount plate 110 in the vertical plane. The third mount plate 134 may be attached to a bottom portion of the vehicle frame 104 such that the third mount plate 134 is substantially attached to underside of the vehicle 102 and parallel to the ground. The first mount plate 108, the second mount plate 110, and the third mount plate 134 may then be attached by fourth support arm 132, which will be described in further detail, following.

The apparatus 100 further includes a pivot assembly associated with the mount plates described previously. In the depicted embodiment, the pivot assembly comprises a first hinge 112 and a second hinge 114. The first hinge 112 is attached (e.g., welded or otherwise coupled using fasteners) to the first mount plate 108 and the second hinge 114 is attached to the second mount plate 110. The first hinge 112 and the second hinge 114, in operation, allow the apparatus 100 to pivot or rotate away from and toward the side of the vehicle 102 in an arc-shaped fashion. That is, the first hinge 112 and the second hinge 114 allow the apparatus 100 (or more particularly, the grill support platform 122 described following) to be positioned into a plurality of positions including a first, stowed position where a grill 124 is secured directly behind and parallel to the vehicle 102; and a second, deployed position where the grill 124 is positioned at an angle between the stowed position and an open position approximate the lateral side of the vehicle 102, which makes the grill 124 accessible for cooking away from the vehicle 102. To wit, the first hinge 112 and the second hinge 114 provide a mechanism whereby the grill 124 may be secured (stowed) directly behind the vehicle 102 or pivoted about the hinges to any degree up to the open position adjacent the side of the vehicle 102 in the vertical plane.

Preferably, the first mount plate 108 and the second mount plate 110 comprise enough material depth to space the first hinge 112 and the second hinge 114 a small distance (i.e., inches) away from the rear of the vehicle 102 such that when the first hinge 112 and the second hinge 114 pivot about their axis, the grill 124 and any supporting arms do not contact the vehicle 102. The first hinge 112 and the second hinge 114 may comprise any convenient hinge known in the art, however in the depicted embodiment the first hinge 112 and the second hinge 114 comprise weld-on barrel type hinges. In some embodiments, the first hinge 112 and the second hinge 114 may include therewith an internal stopping mechanism (not depicted) such that the first hinge 112 and the second hinge 114 may be rotated about their axis into a certain position and held in the certain position until released by user. That is, the first hinge 112 and the second hinge 114 may include an internal mechanism such as a circular plate assembly having a plurality of holes formed thereon and a pin/spring mechanism whereby the user must depress the pin (having resistance provided by the spring) to release the pin received by one of the plurality of holes to move the hinge about its axis. Similarly, upon releasing the pin, the pin may be allowed to protrude back through one of the plurality of holes formed thereon securing that position of the hinge. In other embodiments, the first hinge 112 and the second hinge 114 may comprise self-closing hinges, roller bearing hinges, reverse action spring hinges, or any other hinge types known in the art.

In the depicted embodiment where the first hinge 112 and the second hinge 114 comprise barrel-type hinges, the first hinge 112 and the second hinge 114 may each comprise a upper section and a lower section which independently rotate in relation to one another. In one example, the upper section of the first hinge 112 may be the portion which is attached to the first mount plate 108 and the lower section of the second hinge 114 may be the portion which is attached to the second mount plate 110. The lower portion of the first hinge 112 and the upper portion of the second hinge 114 may then each be attached to a plurality of support arms forming a support arm assembly described following.

The support arm assembly of the apparatus 100 may comprise a first support arm 118 which is directly attached to the lower section of the first hinge 112. The first support arm 118, as depicted, may be angled downward and attach to a mid-portion (i.e., between ½ and ¾ toward an opposite end) of a second support arm 120. That is, the first support arm 118 may comprise a first end attached to the lower section of the first hinge 112 and a second end, opposite the first end, attached to the mid-portion of the second support arm 120 such that the second end is attached to the second support arm 120 at a position distal to the first hinge 112 and the second hinge 114. The second support arm 120 may similarly be directly attached to the upper section of the second hinge 114 and extend a length distal to the first hinge 112 and the second hinge 114 toward the midpoint of the vehicle 102 when the apparatus is in the closed position. The first support arm 118 and the second support arm 120 therefore each extend outwardly toward the midpoint of the vehicle in a horizontal plane.

The support arm assembly may further comprise a third support arm 116 which has a first end attached to the first support arm 118 and a second end, opposite the first end, attached to the second support arm 120 at a position more proximal to the first hinge 112 and the second hinge 114. To wit, the third support arm 116 may be mounted in a vertical orientation as a spacer (and to provide additional support) between the first support arm 118 and the second support arm 120. As illustrated more particularly in FIGS. 3 and 4, the support arm assembly may further comprise a fourth support arm 132 having a first end attached to the first mount plate 108, and a second end, opposite the first end, which extends down the side and wraps underneath the vehicle 102 attaching to the third mount plate 134. The fourth support arm 132 may further be attached to the second mount plate 110 and be shaped such that the fourth support arm 132 is positioned vertically adjacent the lateral side of the vehicle 102 with small branches (i.e., bars) extending horizontally to each of the first mount plate 108, the second mount plate 110, and the third mount plate 134.

Besides serving as an additional support arm for structural integrity of the apparatus 100, the fourth support arm 132 may provide a buffer such that when the apparatus 100 is in the open position (i.e., pivoted toward and/or adjacent the lateral side of the vehicle) that the grill 124 or apparatus 100 itself does not contact the side of the vehicle 102. The first support arm 118, the second support arm 120, the third support arm 116, and the fourth support arm 132 may each comprise bar-type members made of a durable material (e.g., steel), which are rectangular in shape. The first support arm 118, the second support arm 120, the third support arm 116, and the fourth support arm 132 may therefore each have a dimensional length much greater than their dimensional width, and may comprise hollow or solid structures.

The second support arm 120 may have attached a base grill support platform which comprises a plurality of platform support arms 122 extending outwardly from the second support arm 120 and the vehicle 102 in a horizontal orientation. In the depicted embodiment of the apparatus 100, the base grill support platform includes at least three platform support arms 122, however additional or fewer platform support arms may be used according to the implementation. Ideally, the base grill support platform is generally rectangular in shape and has a fixed length and width which is larger than the length of the grill 124 which is supported by the plurality of platform support arms 122. Therefore, the plurality of platform support arms 122 may comprise additional bar-type members of having a dimensional length greater than width. In one embodiment, the grill 124 is directly attached to ones of the plurality of platform support arms 122 via mounting flanges (e.g., mounting flanges secured to a top surface of the plurality of platform support arms 122 to which the grill 124 is fixedly attached) using fasteners such as bolts. In another embodiment, the grill 124 is directly attached to ones of the plurality of platform support arms 122 using fasteners (e.g., bolts) with no mounting flanges, such that the fasteners are received through mounting holes formed in a pattern of the bottom of the grill 124 and through holes formed correspondingly in substantially the same pattern formed through the plurality of platform support arms 122, and secured on an bottom surface thereof.

In some embodiments, one of the first support arm 118, the second support arm 120, the third support arm 116, and/or the fourth support arm 132 may have integrated therewith an electrical outlet receptacle (not shown) which is tied to the internal wiring of the vehicle 102 and provided electricity by vehicle power.

Figure 6:
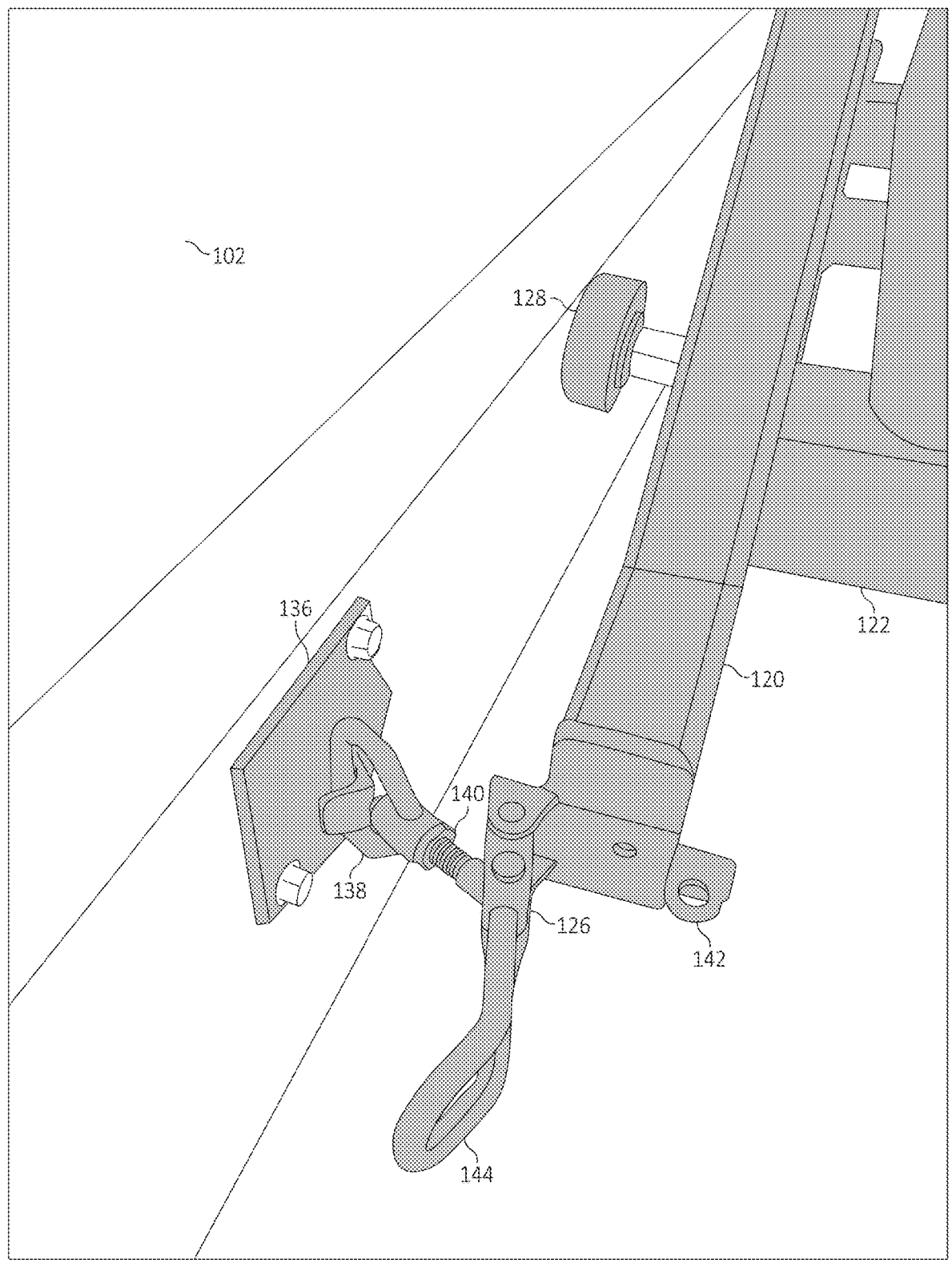
FIG. 6 is a perspective view illustration of a retaining assembly of the grill mounting apparatus according to one embodiment of the present invention.

Referencing now in particular FIG. 6, a retaining assembly is shown for securing the support arm assembly and the base grill platform assembly to the vehicle 102. In one embodiment, the retaining assembly includes a stowage hook 138 mounted to the vehicle frame 104 using a retaining plate 136 at a spaced distance from the pivot assembly. The retaining plate 136 may be comprised of plated material (e.g., a plate of steel) of either square or rectangular dimension having a shorter depth than its length and width. The stowage hook 138 is formed extending outwardly toward the rear of the vehicle 102 and may be engaged by an adjustable clamp 126. The adjustable clamp 126 is attached to the second end of the second support arm 120 (i.e., the end opposite the first end attached to the second hinge 114), such that when the support arm assembly and the base grill support platform are placed in the stowed position, the adjustable clamp 126 is levered forward to engage the stowage hook 138 and then rearward to create tension and secure the adjustable clamp 126 as it faces away from the rear of the vehicle 102, thus securing the apparatus 100 into the stowed position directly behind the vehicle 102. More particularly, once engaged (i.e., once a receiving member of the adjustable clamp 126 is secured onto the stowage hook 138), a handle 144 of the adjustable clamp may be pivoted rearward to close the adjustable clamp 126 and thus secure the retaining assembly in place.

It should be noted that the handle 144 of the adjustable clamp 126 may be u-shaped such that when in the closed position, the handle 144 may be received by a securing flange 142 having a hole formed therethrough into which a pin or other fastener (not shown) may be placed to secure the handle 144 from opening. Similarly, it should be noted that the adjustable clamp 126 may be adjusted by the adjustment screw 140 to vary the tension carried by the clamping force when the adjustable clamp 126 is in the closed position. Conversely, to allow the apparatus 100 to be free to deploy into the open position whereby the apparatus 100 is allowed to pivot about the first hinge 112 and the second hinge 114, the adjustable clamp 126 is levered forward to allow the receiving member of the adjustable clamp 126 to become free from the stowage hook 138.

FIG. 6 (and FIG. 1) additionally details an adjustable bumper assembly 128 along a midpoint of the second support arm 120 such that the bumper assembly 128 is attached to the second support arm 120 and contacts the frame 104 of the vehicle 102 when the apparatus 100 is in the stowed position. The adjustable bumper assembly 128 may comprise a threaded member mounted to the second support arm 120 to which a rubber spacer/stopper is adjustably attached. That is, the rubber spacer of the adjustable bumper assembly may be rotated clockwise or counterclockwise to lengthen or shorten, respectively, the throw length of the threaded member so as to adjust tension placed on the rubber spacer when the apparatus 100 is in the stowed position. The adjustable bumper assembly 128 is provided to mitigate undesired noise or contacting of the support arm assembly and the base grill support platform with the frame 104 of the vehicle 102 during movement of the vehicle 102, when the apparatus 100 is in the stowed position.

Figure 7:
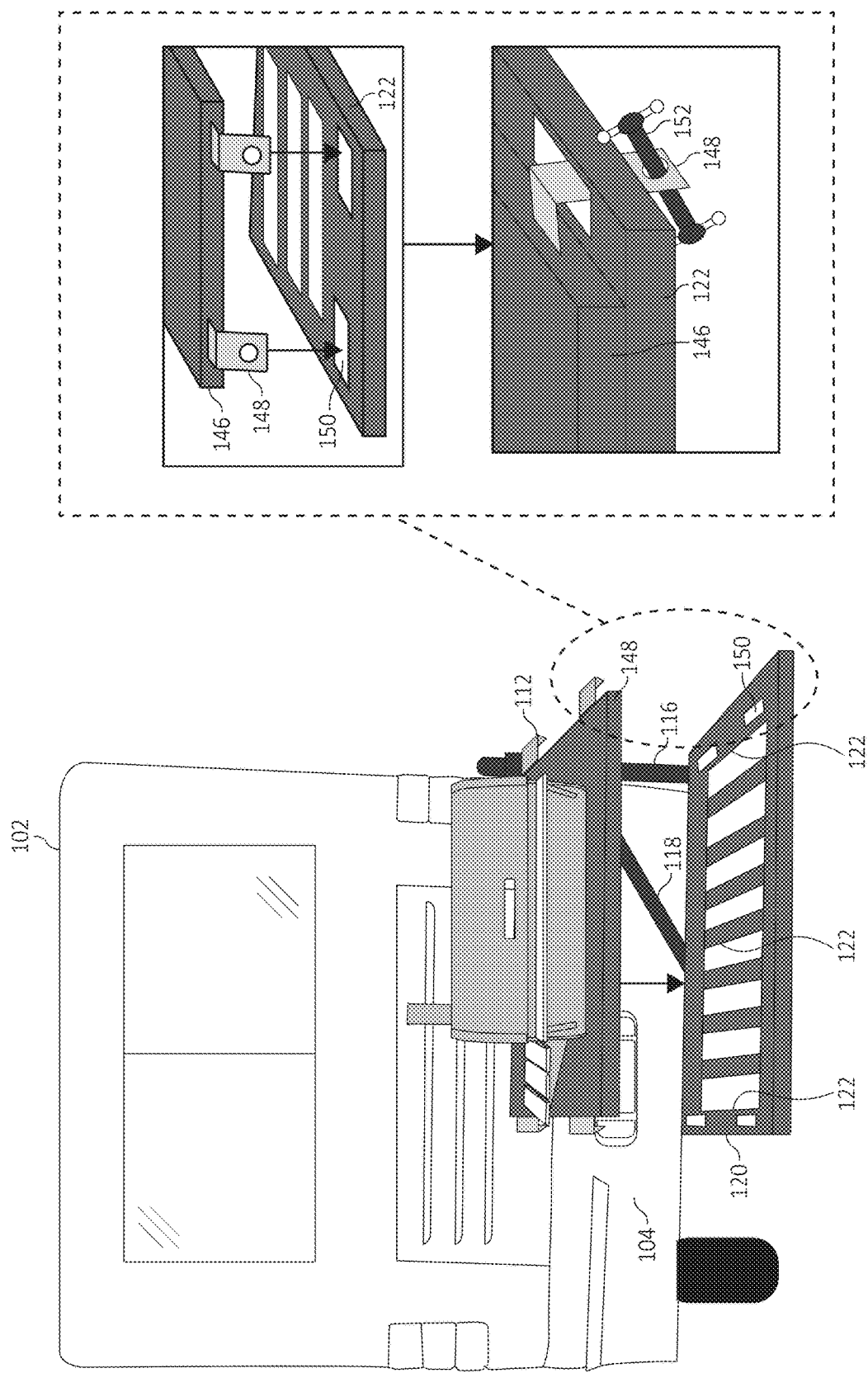
FIG. 7 is a perspective view illustration of a modular grill support platform for the grill mounting apparatus according to one embodiment of the present invention.

Referencing FIG. 7 now, another embodiment of the apparatus 100 is depicted which includes a modular grill platform assembly. The modular grill platform assembly comprises the base grill support platform having the plurality of platform support arms 122, described previously, and a removable grill support platform 146 which sits atop the plurality of platform support arms 122. That is, in this embodiment, the grill 124 is not attached directly to the plurality of platform support arms 122, but is rather attached to the removable grill support platform 146. The removable grill support platform 146 may be made of a single sheet of material (e.g., steel or composite) and be substantially the same width and length as the base grill support platform having the plurality of platform support arms 122.

In the depicted embodiment, the removable grill support platform 146 includes a plurality of tabs 148 at each corner which extend downward to engage corresponding slots 150 formed in ones of the plurality of platform support arms 122. The tabs 148 may further have formed therewith a hole or aperture such that, as the removable grill support platform 146 is lowered onto the base grill support platform (i.e., the removable grill support platform 146 is lowered onto the plurality of platform support arms 122), the tabs 148 are received and pass through the slots 150 formed in corresponding sections of the plurality of platform support arms 122. A fastener 152 (e.g., a pin, a bolt, a lock, etc.) may then be inserted into the hole or aperture to secure the removable grill support platform 146 to the base grill support platform. It should be noted that the view depicted in FIG. 7 provides an exaggerated illustration of the tabs 148 extending outward and downward from a first side and a second side, opposite the first side, of the removable grill support platform 146. In a preferred embodiment, the tabs 148 are formed into a bottom surface (and extend downward therefrom) of the removable grill support platform 146 such that the tabs 148 are not visible when viewing the removable grill support platform 146 from a top-down view when looking at the top surface of the removable grill support platform 146. In other embodiments, the removable grill support platform 146 may be coupled to the plurality of platform support arms 122 using one or more quick-release type fasteners (not shown).

The illustrated embodiment depicts four tabs 148 formed into the removable grill support platform 146 (i.e., one in each corner), however the number of tabs 148 may be any convenient number capable of securing the removable grill support platform 146 to the plurality of platform support arms 122. To wit, it is not so much important as to the number of tabs 148 formed into the removable grill support platform 146 (assuming the number of tabs 148 is enough to provide a secure coupling to the base grill support platform) as it is that the slots 150 of the plurality of platform support arms 122 are in corresponding, juxtaposed positions to receive the tabs 148 therewith. It should be further noted that the exaggerated illustration of FIG. 7 depicts the slots 150 being much larger than the tabs 148 for which they receive. This is for clarity only, and in an actual implementation, the size of the slots 150 should preferably be only slightly larger (e.g., on the order of millimeters) than the tabs 148 the slots 150 receive to prevent undesirable noise or rattling during travel. In some embodiments, the tabs 148 and/or the slots 150 may have formed thereon rubber grommets to prevent such noise and to further prevent movement of the removable grill support platform 146 when secured atop the plurality of platform support arms 122.

The removable grill support platform 146 serves several purposes. Again, in one embodiment, the grill 126 may be directly attached to the plurality of platform support arms 122 using fasteners extending through the base of the grill 126 and through corresponding holes in the plurality of platform support arms. In another embodiment, the grill 126 may be directly attached to the plurality of platform support arms 122 using flanges attached to a top surface of the plurality of platform support arms 122 to which the grill 126 is fixedly attached using fasteners (e.g., bolts). However, each of the aforementioned embodiments inherently require that the grill 126 is semi-permanently mounted to the base grill support platform (i.e., the plurality of platform support arms 122). The removable grill support platform 146 therefore provides a modular system whereby the grill 126 may be attached thereto away from the apparatus 100 and coupled and decoupled to the base grill support platform as desired (e.g., before/after a travel trip). In some embodiments, the removable grill support platform 146 may have the mounting flanges or holes formed in various patterns similar to those described for the plurality of platform support arms in a generic fashion to allow for the attachment of multiple types of grills.

In other embodiments, each removable grill support platform 126 may be tailored to fit a certain type of grill (i.e., the mounting flanges or holes formed therethrough correspond with mounting holes associated with a particular type/make/model of grill) such that the user may maintain several removable grill support platforms 126 for various types of grills the user may own or desire to use. In some embodiments, the removable grill support platform 146 may be fashioned such that a portion of the top surface thereof is dedicated to mounting a particular type of grill while another portion of the top surface thereof is reserved for a working surface while cooking. In other embodiments, the removable grill support platform 146 may have integrated therewith a storage compartment. In other embodiments, the removable grill support platform 146 may have integrated therewith a kitchenette including a small sink or refrigerator. In other embodiments, the removable grill support platform 146 may have integrated therewith an electric or gas stovetop. In other embodiments, the removable grill support platform 146 may have integrated therewith a mechanism for securing gasoline or propane bottles. In other embodiments, the removable grill support platform 146 may have integrated therewith a mechanism for securing a generator. To wit, multiple implementations exist where the removable grill support platform 146, being modular, may each be fashioned with multiple "modules" of functionality. Then, depending on the desire of the user, a selected removable grill support platform 126 may be attached to the base grill support platform before embarking on a trip.

Figure 8:
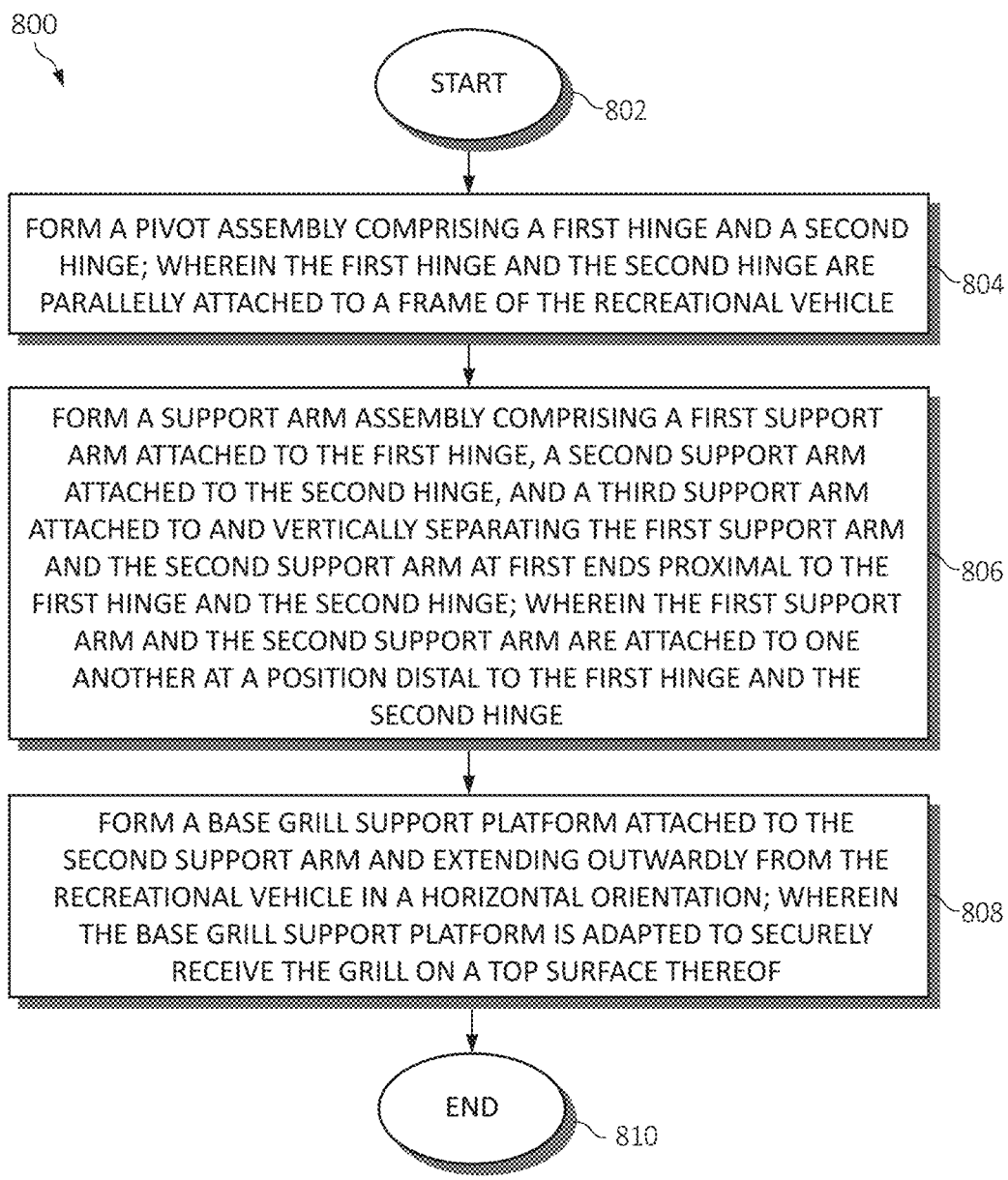
FIG. 8 is a method for manufacturing a grill support apparatus according to one embodiment of the present invention.

Referring now to FIG. 8, a method 800 for manufacturing a grill support apparatus is illustrated, according to an embodiment of the present invention. The method 800 begins at step 802 by forming a pivot assembly comprising a first hinge and a second hinge, where the first hinge and the second hinge are parallelly attached to a frame of the recreational vehicle (step 804). A support arm assembly is formed comprising a first support arm attached to the first hinge, a second support arm attached to the second hinge, and a third support arm attached to and vertically separating the first support arm and the second support arm at first ends proximal to the first hinge and the second hinge; where the first support arm and the second support arm are attached to one another at a position distal to the first hinge and the second hinge (step 806). A base grill support platform is then formed which is attached to the second support arm and extends outwardly from the recreational vehicle in a horizontal orientation; where the base grill support platform is adapted to securely receive the grill on a top surface thereof (step 808). The method 800 ends (step 810).

In conjunction with the method 800, forming the support arm assembly further comprises forming a fourth support arm attached to the first hinge and the second hinge by extending vertically along and below a lateral side of the recreational vehicle; wherein the fourth support arm is attached to a bottom side of the frame of the recreational vehicle.

In conjunction with the method 800, a retaining assembly is formed, comprising: an adjustable clamp attached to the second support arm at a second end opposite the first end; and a stowage hook attached to the frame of the recreational vehicle for receiving and removably coupling to the adjustable clamp.

In conjunction with the method 800, the pivot assembly allows the support arm assembly and the base grill platform to pivot into each of: a stowed position where the grill is positioned directly behind the recreational vehicle when the adjustable clamp is coupled to the stowage hook; and a deployed position where the grill is positioned between the stowed position and an open position approximate the lateral side of the recreational vehicle when the adjustable clamp is decoupled from the stowage hook.

In conjunction with the method 800, an adjustable bumper assembly is formed which is attached to the second support arm and positioned between the second support arm and the frame of the recreational vehicle.

In conjunction with the method 800, forming the base grill support platform includes forming a plurality of platform support arms, and wherein at least two of the plurality of support arms have a plurality of slots formed therethrough.

In conjunction with the method 800, a removable grill support platform is formed which is removably attached to and substantially equal in width and length to the base grill support platform, wherein the removable grill support platform comprises a plate having a top surface and a bottom surface, the top surface having means for securely attaching the grill and the bottom surface having a plurality of tabs for engaging the plurality of slots of the plurality of support arms.

Although the invention has been described with respect to particular embodiments, such embodiments are meant for the purposes of illustrating examples only and should not be considered to limit the invention or the application and uses of the invention. Features of the various embodiments may be used alone and or together with features of other described embodiments. In addition, various alternatives, modifications, and changes will be apparent to those of ordinary skill in the art upon reading this application. Furthermore, there is no intention to be bound by any theory presented in the preceding background of the invention or the above detailed description.

What is claimed is:

1. A grill support apparatus for mounting a grill to a recreational vehicle, comprising:
   a pivot assembly comprising a first hinge and a second hinge; wherein the first hinge and the second hinge are parallelly attached to a frame of the recreational vehicle;
   a support arm assembly comprising a first support arm attached to the first hinge, a second support arm attached to the second hinge, and a third support arm attached to and vertically separating the first support arm and the second support arm at first ends proximal to the first hinge and the second hinge; wherein the first support arm and the second support arm are attached to one another at a position distal to the first hinge and the second hinge; and
   a base grill support platform attached to the second support arm and extending outwardly from the recreational vehicle in a horizontal orientation; wherein the base grill support platform is adapted to securely receive the grill on a top surface thereof; and wherein the support arm assembly further comprises a fourth support arm attached to the first hinge and the second hinge by extending vertically along and below a lateral side of the recreational vehicle; wherein the fourth support arm is attached to a bottom side of the frame of the recreational vehicle.

2. The grill support apparatus of claim 1, further comprising a retaining assembly comprising:
   an adjustable clamp attached to the second support arm at a second end opposite the first end; and
   a stowage hook attached to the frame of the recreational vehicle for receiving and removably coupling to the adjustable clamp.

3. The grill support apparatus of claim 2, wherein the pivot assembly allows the support arm assembly and the base grill platform to pivot into each of:
   a stowed position where the grill is positioned directly behind the recreational vehicle when the adjustable clamp is coupled to the stowage hook; and
   a deployed position where the grill is positioned between the stowed position and an open position approximate the lateral side of the recreational vehicle when the adjustable clamp is decoupled from the stowage hook.

4. The grill support apparatus of claim 1, further comprising an adjustable bumper assembly attached to the second support arm and positioned between the second support arm and the frame of the recreational vehicle.

5. The grill support apparatus of claim 1, wherein the base grill support platform includes a plurality of platform support arms, and wherein at least two of the plurality of support arms have a plurality of slots formed therethrough.

6. The grill support apparatus of claim 5, further comprising a removable grill support platform removably attached to and substantially equal in width and length to the base grill support platform, wherein the removable grill support platform comprises a plate having a top surface and a bottom surface, the top surface having means for securely attaching the grill and the bottom surface having a plurality of tabs for engaging the plurality of slots of the plurality of support arms.

7. A grill support apparatus for mounting a grill to a recreational vehicle, comprising:
   a pivot assembly comprising a first hinge and a second hinge; wherein the first hinge and the second hinge are parallelly attached to a frame of the recreational vehicle at a distance from one another in a vertical orientation;
   a support arm assembly comprising a first support arm having a first end attached to the first hinge, a second support arm having a first end attached to the second hinge, and a third support arm having first and second ends respectively attached to and vertically separating the first end of the first support arm and the first end of the second support arm at a first position proximal to the first hinge and the second hinge; wherein the first support arm and the second support arm are attached to one another at a second position intermediately located on the second support arm distal to the first hinge and the second hinge at a certain angle;
   a grill support platform attached to the second support arm and extending outwardly from the recreational vehicle in a horizontal orientation; wherein the grill support platform includes a plurality of platform support arms adapted to securely receive the grill on a top surface thereof; and wherein the support arm assembly further comprises a fourth support arm attached to the first hinge and the second hinge by extending vertically along and below a lateral side of the recreational vehicle; wherein the fourth support arm is attached to a bottom side of the frame of the recreational vehicle.

8. The grill support apparatus of claim 7, further comprising a retaining assembly comprising:
   an adjustable clamp attached to the second support arm at a second end opposite the first end; and
   a stowage hook attached to the frame of the recreational vehicle for receiving and removably coupling to the adjustable clamp.

9. The grill support apparatus of claim 8, wherein the pivot assembly allows the support arm assembly and the base grill platform to pivot into each of:
   a stowed position where the grill is positioned directly behind the recreational vehicle when the adjustable clamp is coupled to the stowage hook; and
   a deployed position where the grill is positioned between the stowed position and an open position approximate the lateral side of the recreational vehicle when the adjustable clamp is decoupled from the stowage hook.

10. The grill support apparatus of claim 7, further comprising an adjustable bumper assembly attached to the second support arm and positioned between the second support arm and the frame of the recreational vehicle.

11. The grill support apparatus of claim 7, wherein the base grill support platform includes a plurality of platform support arms, and wherein at least two of the plurality of support arms have a plurality of slots formed therethrough.

12. The grill support apparatus of claim 11, further comprising a removable grill support platform removably attached to and substantially equal in width and length to the base grill support platform, wherein the removable grill support platform comprises a plate having a top surface and a bottom surface, the top surface having means for securely attaching the grill and the bottom surface having a plurality of tabs for engaging the plurality of slots of the plurality of support arms.

13. A method of manufacturing a grill support apparatus for mounting a grill to a recreational vehicle, comprising:
   forming a pivot assembly comprising a first hinge and a second hinge; wherein the first hinge and the second hinge are parallelly attached to a frame of the recreational vehicle;
   forming a support arm assembly comprising a first support arm attached to the first hinge, a second support arm attached to the second hinge, and a third support arm attached to and vertically separating the first support arm and the second support arm at first ends proximal to the first hinge and the second hinge; wherein the first support arm and the second support arm are attached to one another at a position distal to the first hinge and the second hinge; and
   forming a base grill support platform attached to the second support arm and extending outwardly from the recreational vehicle in a horizontal orientation; wherein the base grill support platform is adapted to securely receive the grill on a top surface thereof; and wherein forming the support arm assembly further comprises forming a fourth support arm attached to the first hinge and the second hinge by extending vertically along and below a lateral side of the recreational vehicle; wherein the fourth support arm is attached to a bottom side of the frame of the recreational vehicle.

14. The method of claim 13, further comprising forming a retaining assembly comprising:
   an adjustable clamp attached to the second support arm at a second end opposite the first end; and
   a stowage hook attached to the frame of the recreational vehicle for receiving and removably coupling to the adjustable clamp.

15. The method of claim 14, wherein the pivot assembly allows the support arm assembly and the base grill platform to pivot into each of:
   a stowed position where the grill is positioned directly behind the recreational vehicle when the adjustable clamp is coupled to the stowage hook; and
   a deployed position where the grill is positioned between the stowed position and an open position approximate the lateral side of the recreational vehicle when the adjustable clamp is decoupled from the stowage hook.

16. The method of claim 13, further comprising forming an adjustable bumper assembly attached to the second support arm and positioned between the second support arm and the frame of the recreational vehicle.

17. The method of claim 13, wherein forming the base grill support platform includes forming a plurality of platform support arms, and wherein at least two of the plurality of support arms have a plurality of slots formed therethrough; and
   further comprising forming a removable grill support platform removably attached to and substantially equal in width and length to the base grill support platform, wherein the removable grill support platform comprises a plate having a top surface and a bottom surface, the top surface having means for securely attaching the grill and the bottom surface having a plurality of tabs for engaging the plurality of slots of the plurality of support arms.

\* \* \* \* \*